Patented Oct. 9, 1951

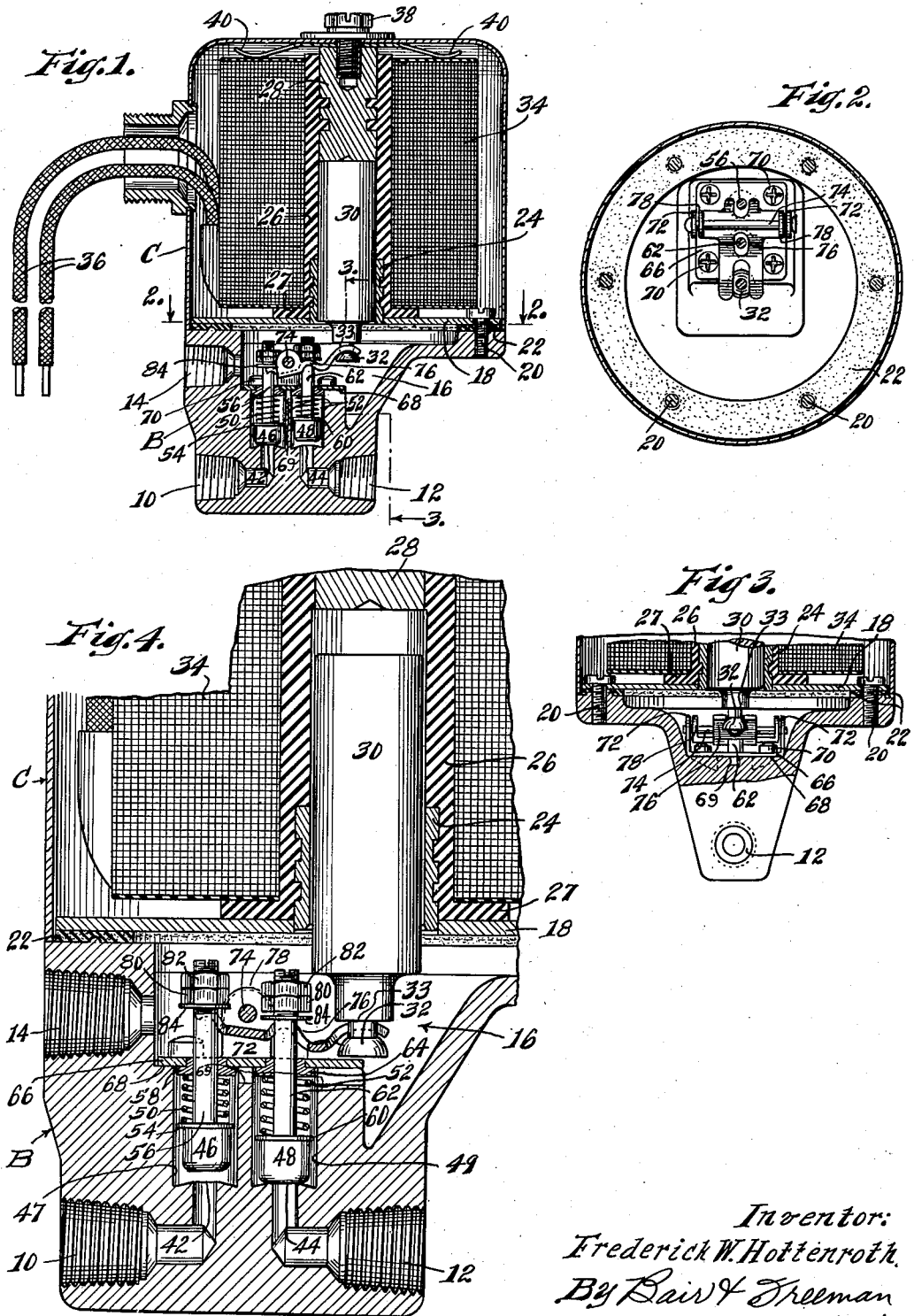

2,570,450

UNITED STATES PATENT OFFICE 2,570,450

THREE-WAY SOLENOID VALVE

Frederick W. Hottenroth, Goshen, Ind., assignor to Penn Electric Switch Co., Goshen, Ind., a corporation of Iowa Application February 19, 1946, Serial No. 648,732

3 Claims. (Cl. 137—144)

My present invention relates to a three-way solenoid valve wherein plug type valves are alternately seated on valve seats under the action of a solenoid plunger depending upon whether a solenoid coil for attracting the plunger is energized or deenergized.

One object of the invention is to provide a valve structure which is somewhat simpler and less expensive to manufacture than the type shown in the copending application of Burton E. Shaw, Serial No. 435,048 filed March 17, 1942, now Patent No. 2,398,452, dated April 16, 1946.

Another object is to provide a valve structure which consists of a body adapted to serve as an end plate for a solenond housing, the valve body having a pair of openings terminating in valve seats and also a chamber between the valve seats, alternately seatable plug valves being provided for the valve seats and operatively connected with a plunger of a solenoid.

Still another object is to provide the plug valves arranged to be spring seated, with a rock lever coactible with the valves to unseat one while permitting the other to seat and vice versa.

A further object is to provide a core in which the solenoid plunger is reciprocably mounted, the core being open to the chamber between the plug valves and sealed relative to the interior of the valve body so as to eliminate leakage at this point and at the same time eliminate the necessity of providing a packing gland between the plunger and the interior of the valve body.

Still a further object is to provide adjusting nuts on the stems of the plug valves so that they can be adjusted to a point where, at opposite limits of movement of the plunger, the respective valves are free to be seated by their seating springs.

With these and other objects in view, my invention consists in the construction, arrangement and combination of the various parts of my device whereby the objects contemplated are attained, as hereinafter more fully set forth, pointed out in my claims and illustrated in the accompanying drawings wherein:

Figure 1 is a sectional view through a three-way solenoid valve embodying my invention and showing the valves at one limit position.

Figure 2 is a sectional view thereof on the line 2—2 of Figure 1.

Figure 3 is a sectional view on the line 3—3 of Figure 1 and,

Figure 4 is an enlarged sectional view of a portion of Figure 1, showing the valves at an opposite limit position.

On the accompanying drawings, I have used the reference character B to indicate a valve body and C a solenoid casing mounted thereon. The body B may be made of brass or any suitable metal and is provided with an inlet opening 10, an outlet opening 12 and an intermediate opening 14. The opening 14 communicates with an interior chamber 16 of the valve body which is defined by the walls of a cavity in the upper end of the body and a cover plate 18. The cover plate 18 is secured to the valve body as by screws 20 with a gasket 22 interposed between the valve body and the cover plate.

The cover plate 18 has a central opening in which a metal sleeve 24 is secured in leak proof manner. A second sleeve 26 of insulating material is molded around the sleeve 24 and has molded in its upper end a plug 28. The parts 24, 26 and 28 together with the cover plate 18 provide a closure for the chamber 16. A solenoid core or plunger 30 is slidably mounted in the sleeves 24 and 26, and has a hemispherical head 32 on its lower end. A solenoid coil 34 surounds the sleeve 26 and serves as a means, when energized with electrical current fed to it through leads 36, as a means to elevate the plunger 30 to the position shown in Figure 1.

There is a substantially closed magnetic path for the solenoid through the plug 28, the casing C and the cover plate 18 which are all made of ferrous material in the usual manner. The casing C is held assembled relative to the cover plate by means of a screw 38 into the plug 28, and a leaf spring 40 serves as a means to hold the solenoid coil 34 against a flange 27 of the sleeve 26.

Within the valve body B, valve seats 42 and 44 are provided communicating with the openings 10 and 12 respectively. Valve plugs 46 and 48 are normally seated on the seats under the action of springs 50 and 52. The spring 50 is interposed between a flange 54 on a valve stem 56 and a washer 58. Similarly the spring 52 is interposed between a flange 60 on a valve stem 62 and a washer 64.

The valve body B has a pair of bores 47 and 49 in which the valve plugs 46 and 48 are mounted. These bores serve as guides in which the flanges 54 and 60 may slide and these slidable connections in cooperation with the slidable connections between the valve stem 56 and the washer 58 as well as the stem 62 and the washer 64 serve to properly guide the valves for movement confined to vertical lines so that the plugs 46 and 48 can seat squarely on the valve seats 42 and 44.

The washers 58 and 64 have shouldered down portions located in openings of a plate-like bracket 66. The bracket 66 is held in position on a land 68 within the chamber 16 of the valve body B by four screws 70. The bracket has a pair of ears 72 bent upwardly from opposite side edges thereof as shown in Figure 2 and adapted to support a pivot pin 74 having a head on one end, its other end being flattened to retain it in position. The land 68 has a groove 69 therein for fluid flow between the chamber 16 and the bores 47 and 49.

Pivotally mounted on the pin 74 is a valve operating lever 76 having suitably shaped portions as shown in Figures 1 and 4 to coact with the valves. The lever 76 has a pair of ears 78 bent up from opposite sides thereof and perforated to receive the pivot pin 74. The lever 76 also has a forked end to coact with the head 32 and a shoulder 33 of the plunger 30. Operative coaction between the lever and the valves is had by mounting on the valve stems 56 and 62 adjusting nuts 80, lock nuts 82 and washers 84 under the adjusting nuts to bear against the lever 76.

Practical operation

In the operation of my three-way solenoid valve, when the solenoid coil 34 is deenergized the plunger 30 will drop down by gravity to the position shown in Figure 4 with its head 32 dropped against the bracket plate 66 and the shoulder 33 against the forked end of the lever 76. This will raise the valve 46 from the seat 42 as illustrated and space the lever 76 and the washer 84 on the valve stem 62 from the adjusting nut 80 on the stem 62. The spring 52 is now free to seat the valve plug 48 against the valve seat 44 so that air or other fluid being controlled can flow from the inlet 10 through the groove 69 to the intermediate opening 14 for performing any function such as opening a diaphragm operated steam valve or the like as described in the copending application above mentioned.

When the solenoid 34 is energized it will effect attraction of the plunger 30 toward the plug 28 as to the position shown in Figure 1 so that the valve 48 is now open and the lever 76 spaced from the adjusting nut 80 of the valve stem 56 thereby permitting the spring 50 to close the valve 46. Air may now flow from the opening 14 of the valve body through the groove 69 to the opening 12 which latter opening is an exhaust to atmosphere thus permitting the steam valve to be reversed in operation.

My valve structure is comparatively simple as far as number of parts and assembly and maintenance are concerned. The interior of the valve is readily accessible for replacing the valves by removing the casing C and the screws 20 so that the cover plate 18 can be taken off the valve body. The plate 66 can thereafter be removed which removes all the movable parts of the valve structure for any type of servicing. The arrangement is such that all leakage is prevented with respect to chamber 16 without the necessity of providing a packed joint between the valve operating lever and the plunger of the solenoid.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a solenoid valve structure of the character disclosed, a valve body having an inlet, an outlet, and an open chamber intermediate said inlet and said outlet and a port communicating with said chamber, a valve seat in communication with said inlet, a second valve seat in communication with said outlet, valve plugs normally spring seated independently of each other on said valve seats, each valve plug having a stem, each plug when unseated affording communication between its respective inlet or outlet and said intermediate chamber, a bracket against which the springs for said valve plugs engage and through which said stems are slidably guided, a rock lever pivotally mounted on said bracket and having portions on opposite sides of the pivot for alternately unseating said valve plugs, passageways from said valve seats to said intermediate chamber and communicating the inlet downstream of one valve seat and the outlet upstream of the other with said intermediate chamber, said rock lever for effecting the unseating operation, a plate for said intermediate chamber, a sleeve sealed relative thereto and having a closed outer end, said plunger being slidable in said sleeve, and a solenoid coil surrounding said sleeve.

2. A valve structure of the character disclosed comprising a valve body, a pair of valve bores therein terminating in valve seats, inlet and outlet connections communicating with said valve seats, an intermediate connection between said valve seats, a bracket covering said valve bores, said valve body having passageways from said bores to said intermediate connection and communicating the inlet downstream of one bore to said intermediate connection and the outlet upstream of the other thereto, valve stems slidably guided through said bracket, valve plugs on said valve stems adapted for seating on said valve seats, springs interposed between said bracket and said valve plugs for normally seating the plugs, said valve stems having enlargements in said bores to slidably mount said valve stems, a pivot carried by said bracket intermediate said valve stems, a rock lever pivoted thereon and having upwardly embossed portions engageable with shoulders on said valve stems to effect alternate slidable movement of said valve stems to operate the valves, a plunger connected with said lever for effecting such operation, and a solenoid for moving said plunger.

3. In a three-way solenoid valve structure, a valve body having an inlet and an outlet, said valve body having an open valve chamber and a port communicating with said chamber, a cover plate for enclosing said chamber against leakage of fluid to atmosphere, a solenoid supported on said cover plate and having a sleeve closed at its outer end and sealed relative to said cover plate, a plunger in said sleeve, said valve body having a pair of valve seats, one communicating with said inlet and said chamber and the other communicating with said outlet and said chamber, valve plugs for seating thereagainst, a seating spring for each valve plug, either plug when unseated permitting communication between the respective inlet or outlet and said chamber, a second cover plate for said valve plugs, said valve body having a passage from said valve seats under said second cover plate to said chamber to afford such communication, said valve plugs having stems guided in said second cover plate and said second cover plate retaining the valve plugs in their assembled positions relative to said valve body, said springs being interposed between said valve plugs and said second cover plate and a rock lever pivoted on said second cover plate for alternately unseating said valve plugs, said rock lever being operatively connected with said plunger.

FREDERICK W. HOTTENROTH.

REFERENCES CITED

The following references are of record in the file of this patent:

UNITED STATES PATENTS

| Number | Name | Date |
|---|---|---|
| 665,704 | Strong | Jan. 8, 1901 |
| 978,579 | Grebel et al. | Dec. 13, 1910 |
| 1,043,018 | Long | Oct. 29, 1912 |
| 1,318,120 | Wheaton | Oct. 7, 1919 |
| 1,956,775 | Ross | May 1, 1934 |
| 2,093,678 | Jacobson | Sept. 21, 1937 |
| 2,200,210 | Taylor | May 7, 1940 |
| 2,398,452 | Shaw | Apr. 16, 1946 |